Patented Aug. 6, 1946

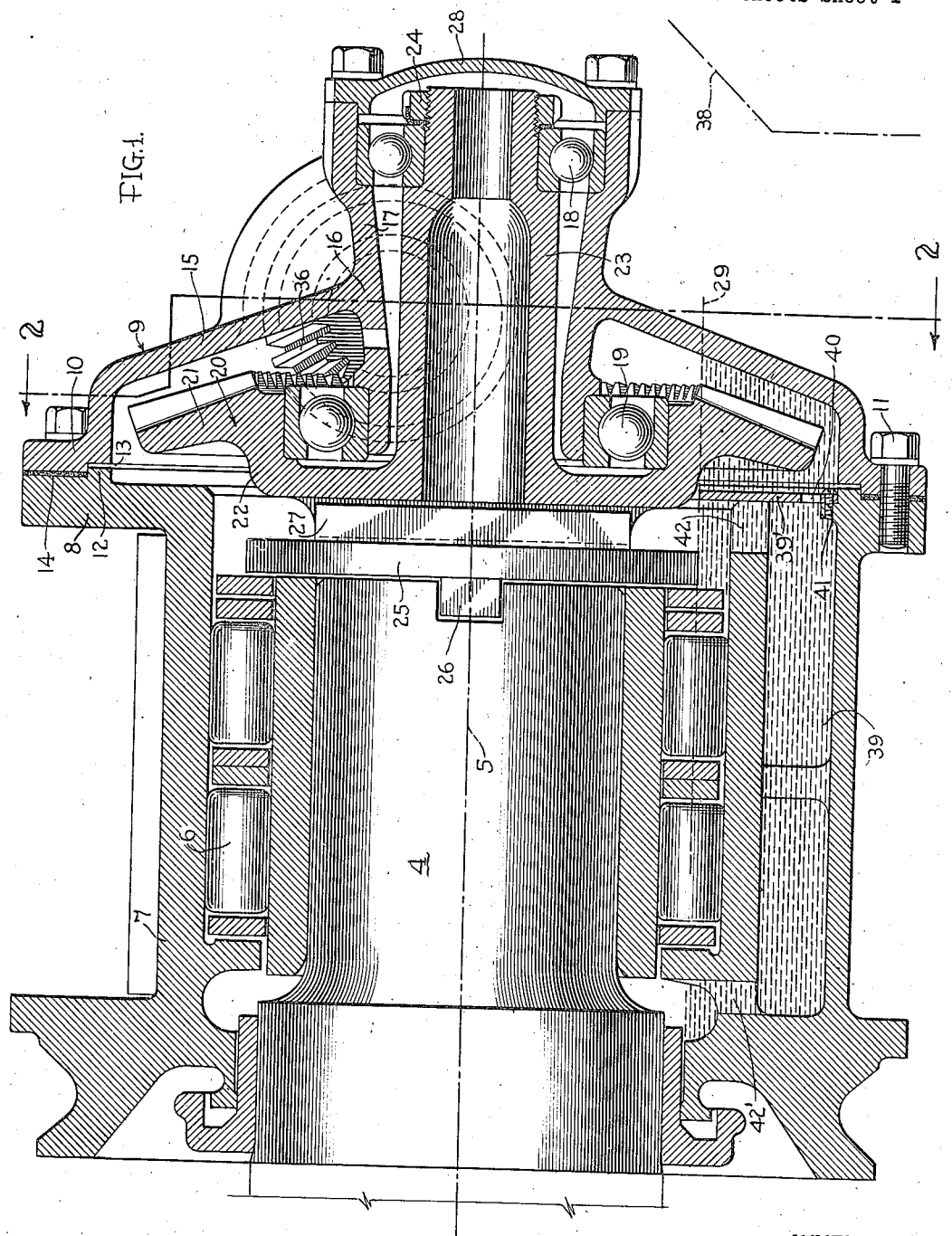

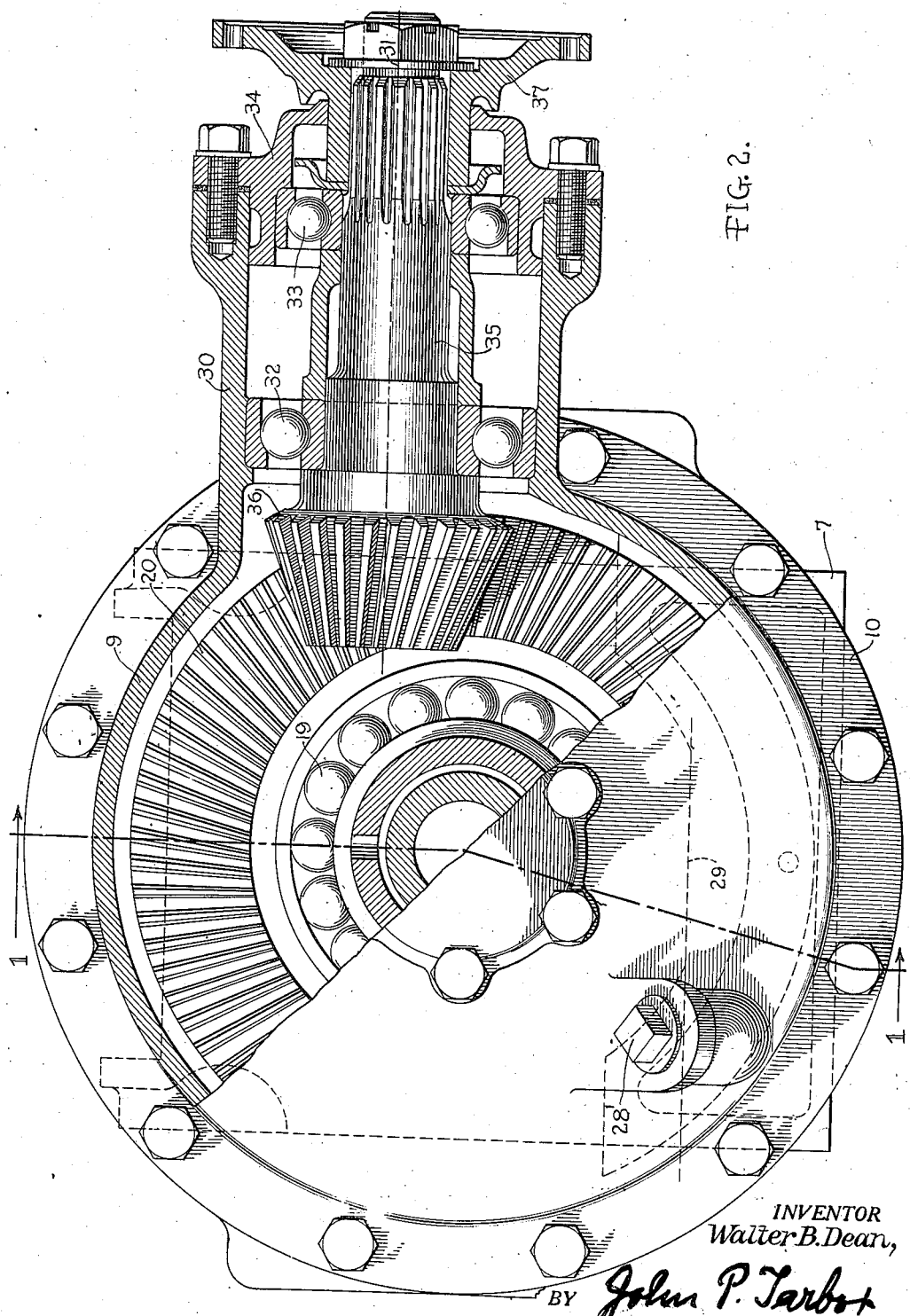

2,405,193

UNITED STATES PATENT OFFICE 2,405,193

AXLE DRIVE, ESPECIALLY FOR RAILWAY VEHICLES

Walter B. Dean, Narberth, Pa., assignor to Edward G. Budd Manufacturing Company, Philadelphia, Pa., a corporation of Pennsylvania Application January 4, 1944, Serial No. 516,929

8 Claims. (Cl. 105—96.1)

The invention refers to an axle drive especially for railway vehicles.

More particularly the invention refers to a drive which is connected with the outer end of an axle and which is particularly adapted for transmitting motive power from the axle to an electric generator suspended on the vehicle chassis or body.

Among the objects of the invention is a drive of the indicated type which can easily be attached to an axle box and coupled with the end of the axle supported therein.

Another object of the invention is an axle drive of the indicated type which is of compact construction so that it stays well within the clearance line.

A still further object of the invention is an axle drive of the indicated type which is sturdy and durable so as to stand long, heavy use without undue wear or failure.

The aforesaid objects of the invention are outstandingly achieved by a bevel gear which is arranged in a cap or cover for the axle box, which has its main body arranged closely to the end of the axle, which is supported in said cover by an outwardly extending hub or stub axle, and which is in driving connection with a bevel pinion arranged on the outer side of the gear.

The aforesaid and further objects, advantages and details of the invention will be more easily and fully understood from the embodiment illustrated in the drawings and described in the following.

In the drawings:

Figure 1 is a vertical section through an axle box and an embodiment of the new drive taken along line 1—1 of Figure 2; and Figure 2 is an end elevation, partly in section along line 2—2 of Figure 1.

An axle 4 is supported rotatably about its axis 5 by cylindrical rollers 6 in an axle box 7. The box 7 has an outer annular flange 8. A cover member 9 is secured by its peripheral flange 10 and bolts 11 to the flange 8. An annular rib 12 and a registering recess 13 on said flanges serve for accurately centering the member 9 with respect to the axle box 7 and thereby with respect to the axis 5. Rib 12 in conjunction with a gasket 14 provides an oil-tight seal between member 9 and axle box 7.

The member 9 has a conical portion 15 extending outwardly away from the flange 10 and connected at 16 to the mid-section of a generally tubular portion 17. The portions 15 and 17 are concentric to the axis 5. The outer end of the tubular portion 17 carries in its interior the outer race of a ball bearing 18, and its inner end carries on its exterior the inner race of the second ball bearing 19.

A bevel gear 20 located in the cover member 9 has a teeth-carrying annular portion 21, a disc portion 22 and an outwardly extending hollow stub axle 23. The disc 22 is inwardly offset with respect to the portion 21 so that a recess is formed for receiving the ball bearing 19 the outer race of which is held by the inner circumference of the portion 21. The stub axle 23 is housed in the tubular portion 17 and its outer end carries on its exterior the inner race of the bearing 18. The gear 20 is held in the cover 9 by said ball bearings 18, 19 and by a lock-nut 24 screw threaded on the extreme outer end of the stub axle 23 and bearing against the inner race of the bearing 18. As the drawing shows, the bearings 18 and 19 are not only adapted for the transmission of radial thrusts but the one bearing is also adapted for transmitting axial thrusts in the one axial direction and the other bearing also for transmitting of axial thrusts in the opposite axial direction.

A coupling disc 25 is in driving connection with the axle 4 and the gear 20 respectively by crossfaced key ways 26 and 27. The coupling permits slight disalignment of the axis of the gear 20 relative to the axis of the axle 4 though exact alignment of both relative to the common axis 5 is, of course, desirable. The coupling disc 25 and its engagement with the axle 4 and the gear 20 constitute also means for transmitting axial thrusts from the axle to the gear and thence over the bearings 18 and 19 and the cover 9 to the axle box 7.

The outer end of the tubular portion 17 of the cover member 9 is closed by a smaller removable cover 28. 28' is a removable oil plug; the lowest point of the opening closed by this plug is at about the height of the desired oil level 29.

The member 9 has on one side a generally tubular extension 30, the axis 31 of which extends about horizontally and is located higher than the axis 5. Held in this tubular extension by means of ball bearings 32, 33 and a cover plate 34 is a shaft 35 which carries on its inner end a bevel pinion 36. The pinion 36 engages from the outside the bevel gear 20. The other end of the shaft 35 carries a coupling member 37 adapted for connection to a shaft with universal joints leading to an electric generator which may be suspended by the truck frame, chassis or body of the vehicle. The last-named parts are not shown because they and their arrangement are well known in the art.

By the described and illustrated arrangement of the bevel gear 20 close to the end of the axle and by the arrangement of the supporting means for the bevel gear and of the bevel pinion on the outside of the bevel gear, all parts of large diameter are located close to the axle box and only portions or members having comparatively small diameter extend outwardly therebeyond.

This results in a structure which is well within the confines of the clearance line indicated at 38 in Figure 1.

The arrangement of the inner ball bearing 19 on the circumference of the tubular portion 17 permits a bearing of large diameter which gives an exceptionally firm and accurate support for the bevel gear 20.

The ability of the ball bearings 18 and 19 to transmit axial thrusts from the axle 4 over the coupling 25 and gear 20 to the cover member 9 and thence to the axle box 8 is important because many axle boxes transmit the axial thrusts through an axial-thrust bearing located in the regular cover for the axle box. Therefore, unless the gear is adapted for transmitting this thrust, it could not be used for the indicated type of axle box constructions.

The proper lubrication of the axle bearing and of the generator drive gear with its bearings is insured by the oil storage chamber 39 provided in the lower part of the axle box cell. The outer end of the chamber 39 is closed by a plate 39' provided near its lowermost point with a hole 40 and held in place by screws, one of which is shown at 41 in Figure 1. The chamber 39 communicates with the interior of the axle box proper through openings 42 and 42'. The upper edge of the plate 39' is arranged at the oil level 29. With this arrangement oil will be carried along by the gear 20 and part of it will be thrown into the interior of the axle box portion containing the axle 4 and its bearings 6. The oil collecting at the bottom of the axle box will flow back to the chamber 39 through openings 42, 42' and thence flow through the hole 40 back to the housing 9 where it is again in reach of the gear 20.

The invention is not restricted to the illustrated and described embodiment but the appended claims are intended to cover all constructions, modifications and adaptations which are based on the principle of the invention.

What is claimed is:

1. Axle drive unit comprising a gear having a gear portion attached to a stub axle by an intermediary radial portion, said stub axle extending axially substantially in one direction only from the plane of the gear portion, a supporting member for said stub axle and for a pinion engaging said gear portion, means adapted for taking up axial thrust in either direction between said stub axle with its gear portion and said supporting member, said pinion being arranged substantially exclusively on that side of the gear portion on which said stub axle is arranged, said supporting member being adapted for the removable attachment to an axle box at the end of an axle so that the stub axle faces outwardly and axially away from the end of the axle and so that said gear portion and said radial portion are arranged close to the end of the axle.

2. Axle drive unit according to claim 1, said removable supporting member forming a cover for the outer end of the axle box.

3. Axle drive unit according to claim 1, coupling means for drivingly connecting said gear to an axle and adapted for transmitting axial thrusts from the axle to the gear.

4. Axle drive unit according to claim 1, said supporting member having two bearings for rotatably supporting said stub axle gear in axially spaced regions, at least one of said bearings being a combined radial and axial thrust bearing, and means for transmitting axial thrusts from the axle supported by the axle box to the stub axle and over said last-named bearing and said supporting member to the axle box.

5. In an axle drive, a cover member adapted for securement near its perimeter to the end of an axle box, said cover member comprising a generally conical portion and a tubular portion, the latter extending through and forming an integral part with said conical portion, said two portions being co-axially arranged so that the tubular portion extends in both axial directions from its connection with the conical portion; a gear having a gear portion, a stub axle and a radial supporting portion, the two former both extending axially in one direction from the latter; said stub axle being located in said tubular portion and said gear portion surrounding the exterior of the inner end of the tubular portion, two bearings, one between the end of the stub axle and the interior of the tubular portion and the other between the exterior of the tubular member and the inner periphery of said gear portion.

6. In an axle box: a generally horizontal partition dividing the box into an upper compartment adapted for the reception of the end of an axle and of bearing means therefor and into a lower compartment adapted for receiving a supply of lubricant; a third compartment at the outer end of the box adapted for the reception of a gear; a generally vertical partition separating the lower compartment and the lower part of the upper compartment from said third compartment; passageways in the lower parts of said partitions permitting the circulation of a lubricant through the three compartments.

7. In an axle drive, a cover member adapted for securement near its perimeter to the end of an axle box, said cover member comprising a generally conical portion and a tubular portion, the latter extending through and forming an integral part with said conical portion, said two portions being co-axially arranged so that the tubular portion extends in both axial directions from its connection with the conical portion; a gear having a gear portion, a stub axle and a radial supporting portion, the two former both extending axially in one direction from the latter; said stub axle being located in said tubular portion and said gear portion surrounding the exterior of the inner end of the tubular portion, a bearing between the end of the stub axle and the interior of the tubular portion and a combined radial and axial thrust bearing between the exterior of the tubular member and the inner periphery of said gear portion for transmitting radial thrusts and besides axial thrusts from the gear to the cover member in the direction toward the apex of the conical portion.

8. In an axle box: a generally horizontal partition dividing the box into an upper compartment adapted for the reception of the end of an axle and of bearing means therefor and into a lower compartment adapted for receiving a supply of lubricant; a third compartment at the outer end of the box adapted for the reception of a gear; a generally vertical partition separating the lower compartment and the lower part of the upper compartment from said third compartment, which partition extends at least partly to about the desired lubricant level only; passageways in the lower parts of said partitions permitting the circulation of a lubricant through the three compartments.

WALTER B. DEAN.